United States Patent [19]

Philbin

[11] Patent Number: 5,190,068
[45] Date of Patent: Mar. 2, 1993

[54] CONTROL APPARATUS AND METHOD FOR CONTROLLING FLUID FLOWS AND PRESSURES

[76] Inventor: Brian Philbin, 150 E. Wagon Wheel Dr., Phoenix, Ariz. 85020

[21] Appl. No.: 907,797

[22] Filed: Jul. 2, 1992

[51] Int. Cl.$^5$ .............................................. G05D 7/06
[52] U.S. Cl. .......................................... 137/8; 137/486; 137/487; 137/487.5
[58] Field of Search .................... 137/486, 487.5, 14, 137/8, 1, 487

[56] References Cited

U.S. PATENT DOCUMENTS

| Re. 29,383 | 9/1977 | Gallatin | 137/487.5 X |
| 3,055,389 | 9/1962 | Brunner | 137/487.5 X |
| 3,757,808 | 9/1973 | Peterson | 137/487.5 X |
| 3,769,998 | 11/1973 | Avant | 137/487 X |
| 3,930,518 | 1/1976 | Fuller | 137/487 |
| 4,000,754 | 1/1977 | Risk | 137/487 |
| 4,026,321 | 5/1977 | Kahoe | 137/487.5 X |
| 4,253,480 | 3/1981 | Kessel | 137/487.5 X |
| 4,277,832 | 7/1981 | Wong | 137/487 X |
| 5,129,418 | 7/1992 | Shimomura | 137/486 |

Primary Examiner—Alan Cohan
Attorney, Agent, or Firm—H. Gordon Shields

[57] ABSTRACT

Control apparatus and method for controlling the flow of fluid across a valve includes a differential pressure measurement across the valve and a flow meter for measuring the flow, and the information from the differential pressure and from the flow meter is compared to predetermined parameters, and in response to the comparison, the valve is modulated to provide the desired flow.

4 Claims, 2 Drawing Sheets

CONTROL APPARATUS AND METHOD FOR CONTROLLING FLUID FLOWS AND PRESSURES

BACKGROUND OF THE INVENTION

1. Field of Invention

This invention relates to control systems and, more particularly, to control systems for controlling fluid flows and pressures by controlling flow through a valve.

2. Description of the Prior Art

U.S. Pat. Re. No. 29,383 (Gallatin et al) discloses a system which uses a pair of manif digitally graduated valves for controlling fluid flow. The manifolds provide output fluid that is measured by a transducer system, and calculated pressure readings from the manifolds are directed to a control circuit that converts analog pressure signals to digital values for operating valves.

U.S. Pat. No. 3,055,389 (Brunner) discloses a sensing system in which fluid flow sensed through a tube by directing fluid pressure to either side of the piston. Motion of the piston is transferred to a variable resistor that in turn controls the motor. The motor is in turn used to control an adjusting element in the balanced bridge circuit, and as a bridge is moved to an unbalanced situation, another motor is actuated to control a valve to vary the fluid flow through the valve.

U.S. Pat. No. 3,757,808 (Peterson et al) discloses a fluid control system in which there are two sensors in a fluid duct. One sensor measures fluid temperature, and the sensor is energized so that its temperature is different from that of the fluid. The differential sensors is indicative from the fluid flow in the duct. A valve is actuated in response to the differential output and to various predetermined parameters for controlling the fluid flow in the duct.

U.S. Pat. No. 3,769,998 (Avant) discloses a valve system in which fluid pressure on each side of the control valve is sensed. Fluid flow is controlled by a plurality of valve elements in response to the measured fluid pressure and predetermined parameters.

U.S. Pat. No. 3,930,518 (Fuller et al) discloses a fluid control system using a pair of sensors connected to a differential pressure switch. The output of the differential switch is used to control a valve.

U.S. Pat. No. 4,000,754 (Risk) discloses a control system which operates automatically to response to fluid pressure in a pair of chambers. Fluid pressure is compared by a regulator and as fluid pressure across a valve changes, a feed back fluid flow adjust the valve to maintain a desired pressure.

U.S. Pat. No. 4,026,321 (Kohoe et al) discloses a differential pressure sensor used across a valve for controlling air flow through a duct. Operation of the valve is responsive to, or is a function of, the pressure sensed by the differential pressure sensor.

U.S. Pat. No. 4,253,480 (Kessel et al) discloses a pressure regulator system in which a comparator compares pressure in a tank to a desired to command pressure that is the input of one leg of the comparator. The output of the comparator controls adjustment devices or valves to a regulator.

U.S. Pat. No. 4,277,832 (Wong) discloses a fluid flow system in which a differential fluid pressure detector is placed across a valve.

Each of the patents discussed above utilizes some type of pressure sensing or flow sensing for controlling fluid flow through a valve. The valve is adjusted in response to the sensed pressure or flow.

The apparatus of the present invention utilizes sensors, but compensates for the change in gain of the valve in flow or pressure as a function of the position of the valve. In this manner, less of a pressure drop across the valve is required, and accordingly better control can be achieved over a relatively wide range of operations. This, in turn, allows the use of a larger valve and a smaller pressure drop and this in turn can result in substantial energy savings while still achieving the desired flow rates or pressures.

SUMMARY OF THE INVENTION

The invention described and claimed herein comprises a differential pressure measurement system placed across a control valve for purposes of determining loop gain. By computing the effective gain of the valve, and by using this gain to compensate a controller, operation of a valve position is accomplished.

Among the objects of the present invention are the following:

To provide new and useful apparatus for controlling the flow of fluid through a valve;

To provide new and useful control apparatus for controlling fluid flow through a relatively larger valve utilizing a relatively smaller pump motor, compressor, fan, or boiler for pumping the fluid;

To provide new and useful control apparatus utilizing a differential pressure measurement across a control valve for determining loop gain, and utilizing the loop gain information, along with a flow or pressure measurement, and the output from the information is compared with desired or set point characteristics, and the valve is positioned or modulated in response to predetermined parameters; and To provide a new and useful method for controlling fluid flows and pressures across an adjustable valve.

BRIEF DESCRIPTION OF PREFERRED EMBODIMENT

Figure 1:
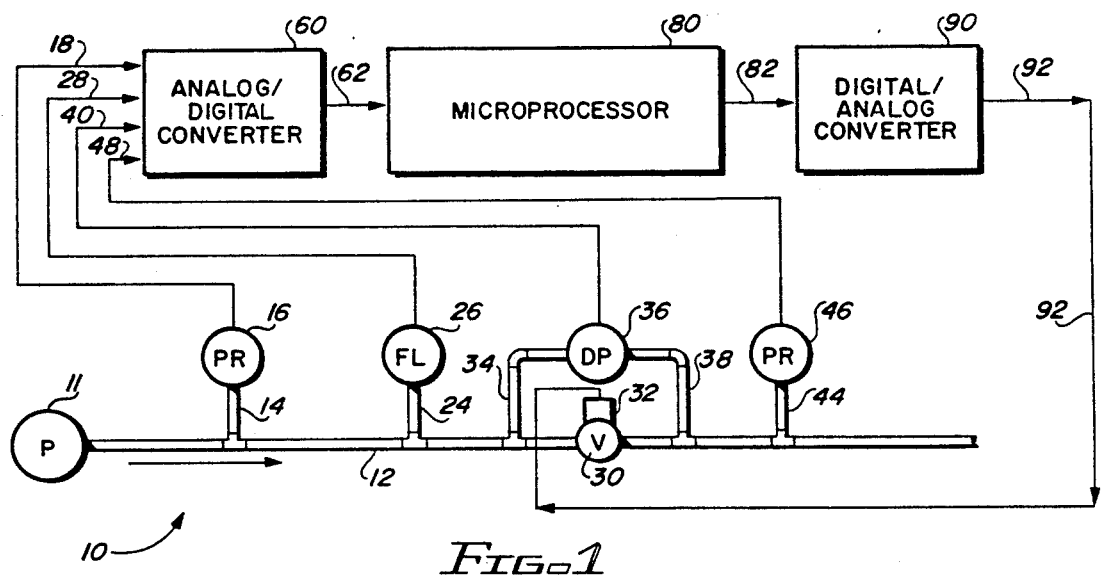
FIG. 1 is a schematic diagram of the apparatus of the present invention in its use environment.

FIG. 1 is a schematic representation of control system 10 of the present invention in its use environment. The apparatus, including the use environment, includes a pressure source 11, which may be a pump connected to a conduit or line 12 through which fluid flows. The direction of the pumped fluid flow is indicated by the relatively large arrow adjacent to the conduit or line 12.

In the conduit or line 12 there is a valve 30. Upstream from the valve 30 is a pressure sensor conduit 14 which extends to a pressure sensor 16, and a flow sensor conduit 24 which extends to a flow sensor 26. The conduits 14 and 24 are both connected to the conduit 12.

Downstream from the valve 30 is a pressure sensor conduit 44 which extends from the conduit or line 12 to a pressure sensor 46. Across the valve 30 there is a differential pressure sensor 36. The differential pressure sensor 36 is connected to the conduit 12 by an upstream conduit 34 and by a downstream conduit 38.

Connected to the valve 30 is a valve actuator or positioner 32. The apparatus of the present invention ultimately transmits signals to the valve actuator 32 to cause the flow through in the line 12 varied by the adjustment of the valve 30.

The upstream pressure sensor 16 is connected to an analog to digital converter 60 by a conductor(s) 18. The flow sensor 26 is connected to the converter 60 by a conductor(s) 28. The differential sensor 36 is connected to the analog to digital converter 60 by a conductor(s) 40. The downstream pressure sensor 46 is connected to the analog digital converter 60 by a conductor(s) 44. The analog to digital converter 60 is a well known and understood element. The converter 60 receives analog information from the sensors and converts the analog information to digital information. The digital information is in turn transmitted to a microprocessor 70 by a conductor(s) 62. For convenience hereafter, the singular term "conductor" will be used. However, as is well known and understood in the electrical control system art, typically a plurality of conductors is required.

The output of the microprocessor 70, which will by discussed in detail below, is in turn transmitted to a digital to analog converter 90 by a conductor 72. The output signal from the digital to analog converter 90 is transmitted by a conductor 92 to the valve actuator 22. The digital to analog converter 90 is also a well known and understood device. It receives output signals from the microprocessor 70 in digital form, and it converts the digital signals to analog signals. The analog signals are in turn used by the valve positioner 32 to adjust the valve 30. In this manner the output in the line 12 through the valve 30 is varied. The flow or pressure through the conduit or line 12 is varied in accordance with predetermined parameters, as desired.

Typically, as is well known and understood in the art, analog signals are in the form of currents or voltages, with the current or voltage varying in response to and correlated with the sensed flow, pressure, etc. For example, a no flow situation in the line 12 may result in a zero voltage output from the flow sensor 26. As the flow increases, an increasing current or voltage output may result.

Digital signals, on the other hand, represent information in discrete binary digits (bytes) or bits of information which comprise a series of ones and zeros, or when current is or is not flowing.

Figure 2:
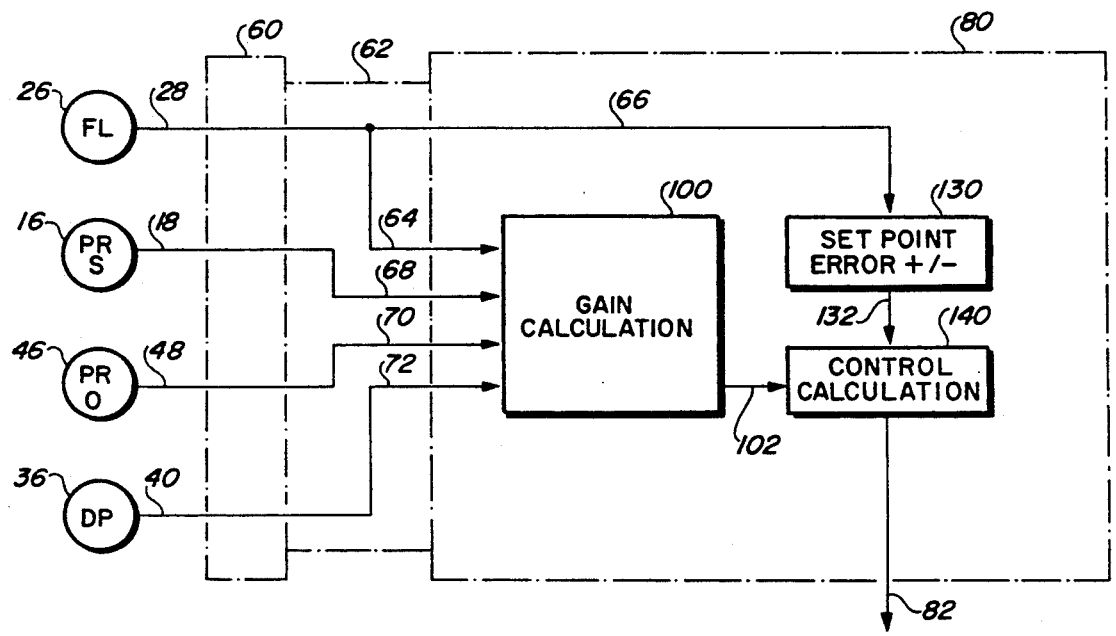
FIG. 2 is a schematic representation of a part of the apparatus of the present invention.

FIG. 2 is a schematic diagram illustrating the operation of the microprocessor 70 in determining a control signal to be transmitted from the microprocessor 70 on conductor 72 to the digital to analog converter 90, and which signal, then in analog form, is transmitted on conductor 92 to the valve positioner 32. For the following discussion, reference will primarily be made to FIG. 2.

The four sensors discussed above in conjunction with FIG. 1 are again shown in FIG. 2. They include the flow sensor 26, with its output conductor 28 extending to the analog to digital converter 60. On the analog to digital converter 60, the output signal from the fluid flow sensor 26 extends on the conductor 64 to a block 100 which represents the gain calculation portion of the microprocessor 80. A conductor 66, which extends from the conductor 64, also transmits the digital signal representing the sensed flow of the flow sensor 26 to a block 130, which represents a set point error calculation of the flow. The set point error calculation block 130 determines whether the flow sensed is above or below the desired amount, or set point.

The set point error, either above or below the desired set point flow, is then transmitted on a conductor 132 to a block 140 which represents the control calculation.

Also included in FIG. 2 are the other sensors, and their outputs are similarly transmitted to the analog to digital converter 60 and from there transmitted to the gain calculation block 100.

The pressure sensor 16, which senses the output pressure pump 11 in the conduit 12, transmits its signal over the conductor 18 to the analog to digital converter 60. The appropriately digitally converted output is transmitted on conductor 68 the gain calculation block 100.

The output pressure sensor 46, which senses the pressure of the flow in the conduit 180 downstream from the valve 30, transmits its signal on the conductor 48 to the analog to digital converter 60. The digital output is transmitted on a conductor 70 to the gain calculation block 100.

Finally, the differential pressure sensor 36 transmits its output signal on the conductor 40 to the analog to digital converter 60. The digitally converted output signal is transmitted on a conductor 72 to the gain calculation block 100. Thus, the gain calculation block 100 includes all of the sensed pressure and flow signals from the various sensors, including the flow sensor, the upstream and downstream pressure sensors, and the differential pressure sensor. The gain calculation block 100 then calculates the gain across the valve 30 in response to changes in the valve position.

The gain calculation is defined as the change in the output through the valve 30 in response to a change in the valve position. The set point, of course, is the desired flow in the conduit 12 downstream from the valve 30.

The gain calculation output signal from the block 100 is transmitted on a conductor 102 to the control calculation block 40. The control calculation block 140 takes the two input signals, the gain calculation signal on the conductor 102 and the set point error signal, which may either be positive or negative, on the conductor 132, and then it calculates an appropriate adjustment for the valve actuator 32.

The output signal from the control calculation block 140 is transmitted on the conductor 82 to the digital to analog converter 90 (see FIG. 1). The digital to analog converter 90 then transmits its signal, in the form of a voltage output, on the conductor 92 to the valve actuator 32. The valve actuator 32 in turn, and in response to the signal on the conductor 92, makes a change in the valve 30 to provide the desired output through the valve 30 in the conduit 12.

Figure 3:
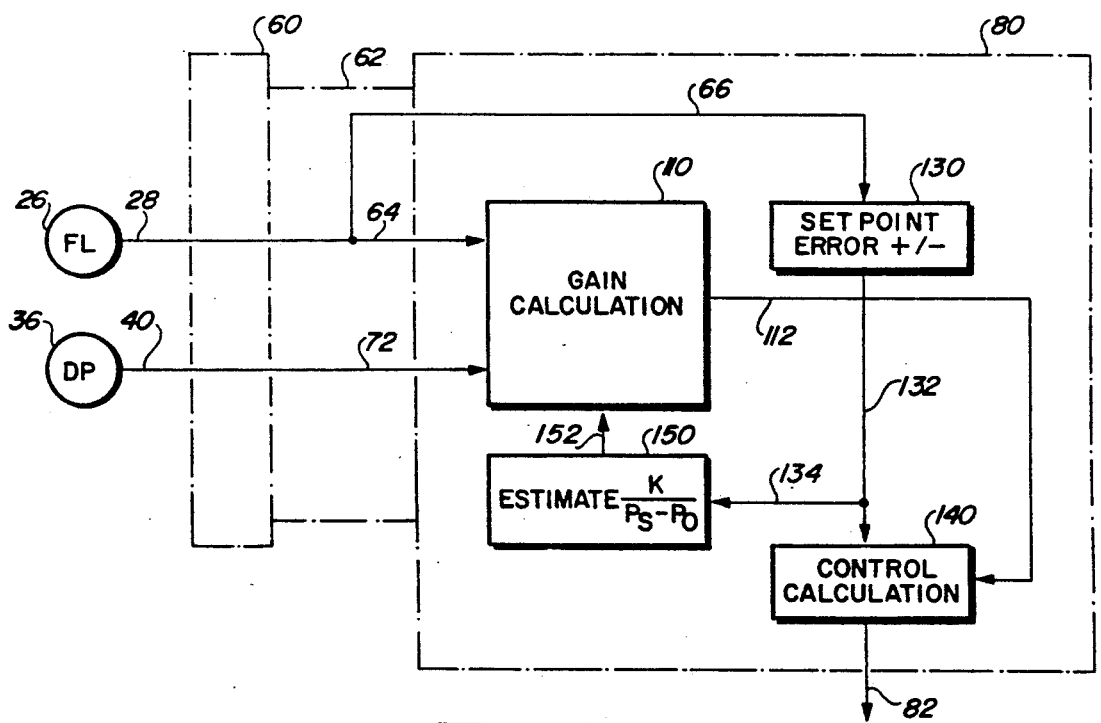
FIG. 3 is a schematic representation of an alternate embodiment of part of the apparatus of the present invention.

While FIG. 2 illustrates the gain calculation when four inputs are available, FIG. 3 comprises a schematic diagram illustrating the calculation of gain when only the fluid flow from the sensor 26 and the differential pressure across the valve 30 by the sensor 36 are know and are accordingly available. In this situation, the path of the signals from the flow sensor 26 and the differential pressure sensor 36 are substantially the same as illustrated in FIG. 2. However, the signals on the conductor 64 and 72 from the analog to digital converter 60 extend to a again calculation block 110. The gain calculation block 110 uses only the input from the two sensors and an estimate of the total flow in determining its output signal. The output from the gain calculation block 110 extends to the control calculation block 140 on a conductor 112.

The output from the set point error block 130 is transmitted to the control calculation block 140, and comprises one of the two inputs to the control calculation block 140, just as illustrated in FIG. 2. However, the set point error signal is also transmitted to an estimate block 150 on a conductor 134. The conductor 134 extends from the conductor 132 to the estimate block 150.

In the estimate block 150, the letter "K" represents the general gain across the valve 30, and the two pressures, the input pressure $p_s$ and the output pressure $p_o$ comprise the denominator in which the "K" is the numerator. The block 150 estimates the fraction K divided by $p_s$ minus $p_o$ by using a valley descending algorithm which seeks to minimize the error squared of the controller by making slight changes in the estimates of the fraction The output from the estimate block 150 is then transmitted to the gain calculation block 110 on a conductor 152. The gain calculation block 110 accordingly uses the three inputs to calculate the gain across the valve 130. The output of the gain calculation block 110 is one of the three inputs to the control calculation block 140. The control calculation block 140 is a proportional plus integral plus derivative controller, well known and understood in the art, and which takes its two inputs, in both the embodiments in FIG. 2 and FIG. 3, to derive an output signal which is transmitted, ultimately, to the actuator 32.

Figure 4:
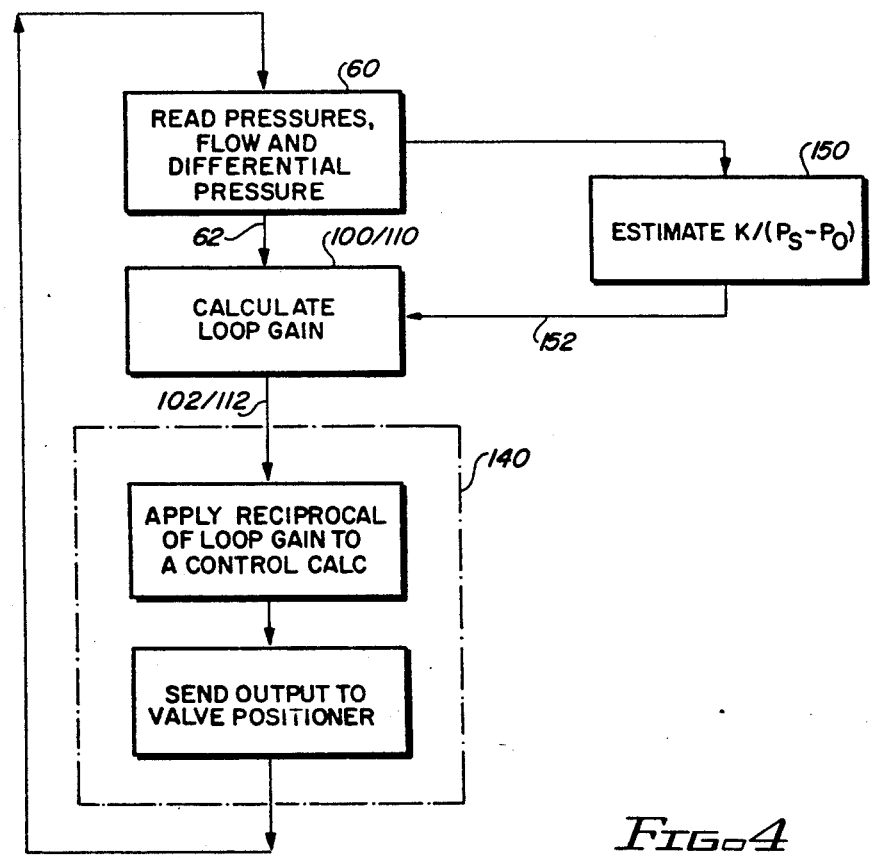
FIG. 4 is a block diagram of the operation of the apparatus of the present invention.

FIG. 4 is a schematic representation of the logic loop utilized by the apparatus of the present invention. For convenience in understanding the logic loop of FIG. 4, the reference numerals generally used to identify the blocks are correlated with the blocks indicated in FIGS. 1 and 2, and 3.

The first block in FIG. 4 refers to the reading of the pressures, flow and differential pressure, best understood from reference to FIG. 1. In FIG. 4, that particular block has been designated as block 60, which comprises the analog to digital converter for converting the analog readings to digital information which is in turn transmitted to the microprocesser 80 in the conductor(s) 62 for appropriate processing. In FIGS. 2 and 3, the gain calculation blocks 100 and 110 are used to calculate the gain directly from the four input readings, as shown in FIG. 2, or the gain calculation block 110 is used to calculate the gain from a fluid flow and differential reading, and also the estimate block 150. In FIG. 4, the estimate block 150 is shown as receiving an input from the block 60 and transmitting its output to the calculate loop gain block.

As discussed above, when all four sensor readings are available, the estimate block 150 is not utilized. Rather, the calculation of the loop gain is accomplished directly from the four pressure flow readings. On the other hand, as indicated in FIG. 3, when only two input readings are available, then an estimate of the gain divided by the upstream pressure minus the downstream pressure is used for calculating the gain.

After the loop gain is calculated, the control calculation is made. In FIG. 4, there are two blocks in the gain control calculation block 140. The two blocks include the applying of a reciprocal of loop gain to control calculation and transmitting an output signal to the valve positioner based on the control calculation.

After the valve has been appropriately positioned, the sensor readings are again taken and the process continues until the desired flow across the valve 30 is achieved. With a substantially constant or continuous monitoring of the sensors, the valve 130 is appropriately adjusted so that the desired pressure and flow is substantially continuously maintained.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Control apparatus for controlling fluid flows and pressures in a conduit comprising, in combination:
    valve means for controlling a flow of fluid in a conduit;
    means for sensing a first pressure in the conduit upstream from the valve means;
    means for sensing a rate of flow in the conduit upstream from the conduit;
    means for sensing differential pressure across the valve means;
    means for sensing a second pressure in the conduit downstream from the valve means;
    means for adjusting the valve means to change the flow of fluid in the conduit;
    means for calculating a change in the flow of fluid in the conduit in response to an adjustment of the valve means and in response to the sensed first and second pressures, the sensed rate of flow, and the differential; and
    means for providing an output signal to the means for adjusting the valve means in response to the calculated change in the flow of fluid in the conduit.

2. The apparatus of claim 1 in which the means for calculating a change in the fluid flow includes means for comparing the change in the fluid flow to a predetermined set point flow.

3. A method of controlling a flow of fluid in a conduit comprising the steps of
    providing an adjustable valve in the conduit;
    sensing the differential pressure of the fluid flow across the valve;
    sensing the pressure of the fluid flow upstream from the valve;
    sensing the flow rate of the fluid upstream from the valve;
    comparing the flow rate of the fluid upstream from the valve to a predetermined desired flow rate;
    sensing the pressure of the fluid flow downstream from the valve;
    calculating the change in flow across the valve in response to the sensed differential pressure, the sensed upstream and downstream pressures, and the sensed flow rate;
    comparing the change in flow to the predetermined desired flow rate;
    calculating an adjustment in the valve in response to the compared flows; and
    adjusting the valve in response to the calculated adjustment.

4. A method of controlling a flow of fluid in a conduit comprising the steps of
providing an adjustable valve in the conduit;
sensing the differential pressure of the fluid flow across the valve;
sensing the flow rate of the fluid upstream from the valve;
comparing the flow rate of the fluid upstream from the valve to a predetermined desired flow rate;
providing a fraction comprising an estimate of the gain across the valve divided by the difference between the pressures of the flow upstream and downstream from the valve;
calculating an adjustment in the valve in response to the fraction and the sensed flow rate and differential pressure; and
adjusting the valve in response to the calculated adjustment.

* * * * *